US011290374B2

(12) United States Patent
Rochwerger et al.

(10) Patent No.: US 11,290,374 B2
(45) Date of Patent: Mar. 29, 2022

(54) MULTI-LAYER TRAFFIC STEERING FOR SERVICE CHAINING OVER SOFTWARE DEFINED NETWORKS

(71) Applicant: RADWARE, LTD., Tel Aviv (IL)

(72) Inventors: Benny Rochwerger, Zichron Yaakov (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 587 days.

(21) Appl. No.: 14/743,229

(22) Filed: Jun. 18, 2015

(65) Prior Publication Data

US 2015/0372929 A1 Dec. 24, 2015

Related U.S. Application Data

(60) Provisional application No. 62/013,762, filed on Jun. 18, 2014.

(51) Int. Cl.
| | |
|---|---|
| *G06F 15/16* | (2006.01) |
| *H04L 45/00* | (2022.01) |
| *H04L 47/24* | (2022.01) |
| *H04L 45/30* | (2022.01) |
| *H04L 47/2475* | (2022.01) |
| *H04L 47/2425* | (2022.01) |

(52) U.S. Cl.
CPC ........... *H04L 45/38* (2013.01); *H04L 45/306* (2013.01); *H04L 47/24* (2013.01); *H04L 47/2475* (2013.01); *H04L 47/2425* (2013.01)

(58) Field of Classification Search
CPC ......... H04L 45/00; H04L 12/00; H04L 45/38; H04L 45/306; H04L 47/24; H04L 47/2475

USPC ........................................ 709/238, 221, 219
See application file for complete search history.

(56) References Cited

U.S. PATENT DOCUMENTS

| | | |
|---|---|---|
| 7,340,506 B2 | 3/2008 | Arunachalam |
| 7,415,018 B2 | 8/2008 | Jones et al. |
| 8,051,176 B2 | 11/2011 | Thomas et al. |
| 9,210,078 B2 | 12/2015 | Shahar |
| 9,391,901 B2 | 7/2016 | Shahar |

(Continued)

OTHER PUBLICATIONS

Bart Salaets, "Optimizing mobile VAS service platforms with intelligent traffic steering", Updated Feb. 24, 2014.*

(Continued)

*Primary Examiner* — Oscar A Louie
*Assistant Examiner* — Messeret F Gebre
(74) *Attorney, Agent, or Firm* — M&B IP Analysts, LLC

(57) ABSTRACT

A method and system for multi-layer traffic steering for enabling service chaining over a software defined network (SDN) are provided. The method is performed by a central controller of the SDN and includes receiving at least one service chaining rule defining at least one value-added service (VAS) to assign to an incoming traffic flow addressed to a destination server; analyzing each of the at least one received service chaining rule to determine if an application-layer steering is required; generating at least one application-layer steering rule, upon determining that an application-layer steering is required; generating at least one network-layer steering rule, upon determining that an application-layer steering is not required; and programming a multi-layer steering fabric with the generated at least one of network-layer steering rule and application-layer steering rule.

22 Claims, 5 Drawing Sheets

(56) References Cited

U.S. PATENT DOCUMENTS

| | | |
|---|---|---|
| 2004/0093406 A1 | 5/2004 | Thomas et al. |
| 2006/0233101 A1 | 10/2006 | Luft et al. |
| 2008/0109331 A1 | 5/2008 | Stadelmann et al. |
| 2008/0192756 A1 | 8/2008 | Damola et al. |
| 2009/0074411 A1 | 3/2009 | Bernard et al. |
| 2009/0138577 A1 | 5/2009 | Casado et al. |
| 2009/0323536 A1 | 12/2009 | Liu et al. |
| 2010/0132031 A1 | 5/2010 | Zheng |
| 2011/0060851 A1 | 3/2011 | Monchiero et al. |
| 2011/0145902 A1 | 6/2011 | Kim et al. |
| 2012/0084423 A1 | 4/2012 | McGleenon |
| 2012/0084460 A1* | 4/2012 | McGinnity ........... H04L 67/327 709/242 |
| 2013/0051399 A1 | 2/2013 | Zhang et al. |
| 2013/0070762 A1 | 3/2013 | Adams et al. |
| 2013/0124707 A1 | 5/2013 | Ananthapadmanabha et al. |
| 2013/0163426 A1 | 6/2013 | Beliveau et al. |
| 2013/0163475 A1 | 6/2013 | Beliveau et al. |
| 2013/0223442 A1 | 8/2013 | Narayanan et al. |
| 2013/0329734 A1* | 12/2013 | Chesla ................ H04L 45/74 370/392 |
| 2013/0347110 A1 | 12/2013 | Dalal |
| 2014/0233385 A1* | 8/2014 | Beliveau .............. H04L 47/122 370/235 |
| 2015/0295728 A1 | 10/2015 | Kadel et al. |
| 2015/0341377 A1* | 11/2015 | Kasturi ................ G06F 16/955 726/23 |
| 2017/0187609 A1* | 6/2017 | Lee ........................ H04L 41/12 |

OTHER PUBLICATIONS

Bart Salaets, "Advanced Traffic Steering & Optimization Technologies", https://www.menog.org/presentations/menog-14/272-Advanced_Traffic_Steering_v04.pdf, pp. 1-31, Mar. 31, 2014.*
S. Agarwal, M. Kodialam and T. V. Lakshman, "Traffic engineering in software defined networks," 2013 Proceedings IEEE Infocom, 2013, pp. 2211-2219 (Year: 2013).*
Bi, C., Luo, X., Ye, T., & Jin, Y. (2013). On precision and scalability of elephant flow detection in data center with SDN (Year: 2013).*
M. Caria, A. Jukan and M. Hoffmann, "A performance study of network migration to SDN-enabled Traffic Engineering," 2013 IEEE Global Communications Conference (GLOBECOM), 2013, pp. 1391-1396 (Year: 2013).*
Open Networking Foundation, "Software-Defined Networking: The new Norm for Networks", Apr. 13, 2012, One White paper, p. 1-12.

* cited by examiner

| Source IP Address | Destination IP Address | Port IP | TCP Port | ... | Cookie | URL Path | User urgent | ... | L7 Services |
|---|---|---|---|---|---|---|---|---|---|
| - | IP - 2010 | - | - | - | Ad1@site1 | - | IE | - | Content filtering |
| IP - 00010 | IP - 1001 | - | - | - | Ad4@site1 | - | IE | - | Content filtering |
| . | . | . | . | . | . | . | . | . | . |

{310} = Source IP Address, Destination IP Address, Port IP, TCP Port
{320} = Cookie, URL Path, User urgent
{330} = L7 Services

FIG. 3

MULTI-LAYER TRAFFIC STEERING FOR SERVICE CHAINING OVER SOFTWARE DEFINED NETWORKS

CROSS REFERENCE TO RELATED APPLICATIONS

This application claims the benefit of U.S. provisional application No. 62/013,762 filed on Jun. 18, 2014, the contents of which are hereby incorporated by reference.

TECHNICAL FIELD

This disclosure generally relates to software defined networks (SDN) and, particularly, to techniques for allowing multi-layer traffic steering over SDN.

BACKGROUND

A software defined network (SDN) is a relatively new type of networking architecture that provides centralized control of network elements rather than a distributed architecture utilized by conventional networks. That is, in a distributed architecture, each network element makes a routing decision based on the results of traffic processing and a distributed control mechanism. In contrast, in a SDN, a network element follows routing decisions received from a central controller. In detail, the operation of a network element can be logically divided into a "control path" and a "data path". In the control path, control protocols, e.g., for building in routing tables, are operable. In the data path, packet-processing operations are performed. Such operations include examining each input packet and making decisions based on the examination as to how to handle the input packet (e.g., packet forwarding, packet switching, bridging, load balancing, and so on). Furthermore, in a conventional network, network elements typically include both a control plane and a data plane, whereas in a SDN the network elements include the data path, and the central controller implements the control path.

The SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, and so on, as well as any virtual instantiations thereof.

In one configuration of a SDN, the central controller communicates with the network elements using an Open Flow protocol which provides a network abstraction layer for such communication. Specifically, the OpenFlow protocol allows adding programmability to network elements for the purpose of packets-processing operations under the control of the central controller, thereby allowing the central controller to define the traffic handling decisions in the network element.

Traffic received by a network element that supports the OpenFlow protocol is processed and routed according to a set of rules defined by the central controller based on the characteristics of the required network operation. Such a network element routes traffic according to a flow table and occasionally sends packets to the central controller. Each network element can be pre-configured with a flow table and can be modified by the central controller as required.

Thus, the programmability SDN allow utilization of the hardware speed processing capability of conventional network elements while providing more flexibility in the traffic packet-processing decisions. As noted above, packets-processing operations include, but are not limited to, routing, load balancing, forwarding, switching, and bridging of packets.

The programmability of the SDN allows for service chaining which is dynamic steering of traffic from a network external to the SDN through a number of value added-services (VAS) before the traffic reaches the destination server. Examples for value-added services include parental control, security services (e.g., anti-virus), access control, traffic optimization, analytic services, and content filtering. As an example for the traffic steering, traffic from customers subscribed to a parental control VAS can be identified and redirected to a content filtering server prior to reaching the final destination.

While the SDN-based protocols allow programmability of network elements in the SDN, such means does not define how this capability can be utilized to efficiently provide value added services to subscribers. In particular, the currently defined SDN-based protocols (e.g., Open Flow) are not designed for analyzing application layer (layer-7 or L7 of the OSI module) parameters and attributes, but merely limited to classification of layer-4 network parameters. Typically, SDN-based switches and controllers can take routing decisions based on MAC (L2), network (L3), or transport (L4) layers parameters. For example, the action to apply on each packet can be based on a source IP address and/or a destination IP address.

In order to provide the data services, and in particular VAS, with their assigned provisions, application layer L7 processing is required, for example, to identify the application and/or protocol type associated with the flow of traffic. Furthermore, the application layer (L7) processing is required to take routing decisions per flow. Processing of application layer (L7) traffic demands high network and computing resources. This demand results in some major drawbacks on the utilization available.

For example, extensive processing of traffic at the application layer (L7) would result in inefficient use of network bandwidth and computing resources, bottlenecks, and lack of coverage due to inability to rapidly respond to new networking and application requirements, reduced throughput, increased latency, and limited scalability of the network due to limited computing resources. In addition, the data services do not provide feedback regarding their performance. As a result, network paths can potentially be reprogrammed based on the application layer traffic analysis.

It would therefore be advantageous to provide an efficient solution that provides for steering traffic in SDNs based on minimal processing of application layer traffic.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

The disclosure relates in various embodiments to a method for multi-layer traffic steering for enabling service chaining over a software defined network (SDN). The method is performed by a central controller of the SDN and comprises receiving at least one service chaining rule defining at least one value-added service (VAS) to assign to an incoming traffic flow addressed to a destination server; analyzing each of the at least one received service chaining rule to determine if an application-layer steering is required; generating at least one application-layer steering rule, upon determining that an application-layer steering is required; generating at least one network-layer steering rule, upon determining that an application-layer steering is not required; and programming a multi-layer steering fabric with the generated at least one of network-layer steering rule and application-layer steering rule.

The disclosure also relates in various embodiments to a system for multi-layer traffic steering for enabling service chaining over a software defined network (SDN). The system comprises a processing unit; and a memory, the memory containing instructions that, when executed by the processing unit, configure the system to: receive at least one service chaining rule defining at least one value-added service (VAS) to assign to an incoming traffic flow addressed to a destination server; analyze each of the at least one received service chaining rule to determine if an application-layer steering is required; generate at least one application-layer steering rule, upon determining that an application-layer steering is required; generate at least one network-layer steering rule, upon determining that an application-layer steering is not required; and program a multi-layer steering fabric with the generated at least one of network-layer steering rule and application-layer steering rule.

The disclosure also relates in various embodiments a multi-layer steering fabric connected in a software defined network (SDN) comprising: an array of application delivery controllers (ADCs) configured to perform application-layer (L7) analysis, wherein each of the array of ADCs is programmable to perform application-layer steering rules; and a plurality of SDN-based network elements, wherein each of the plurality of SDN-based network elements is programmable to perform network-layer steering rules.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 illustrates a classification table generated by a central controller of the SDN.

DETAILED DESCRIPTION

Figure 1:
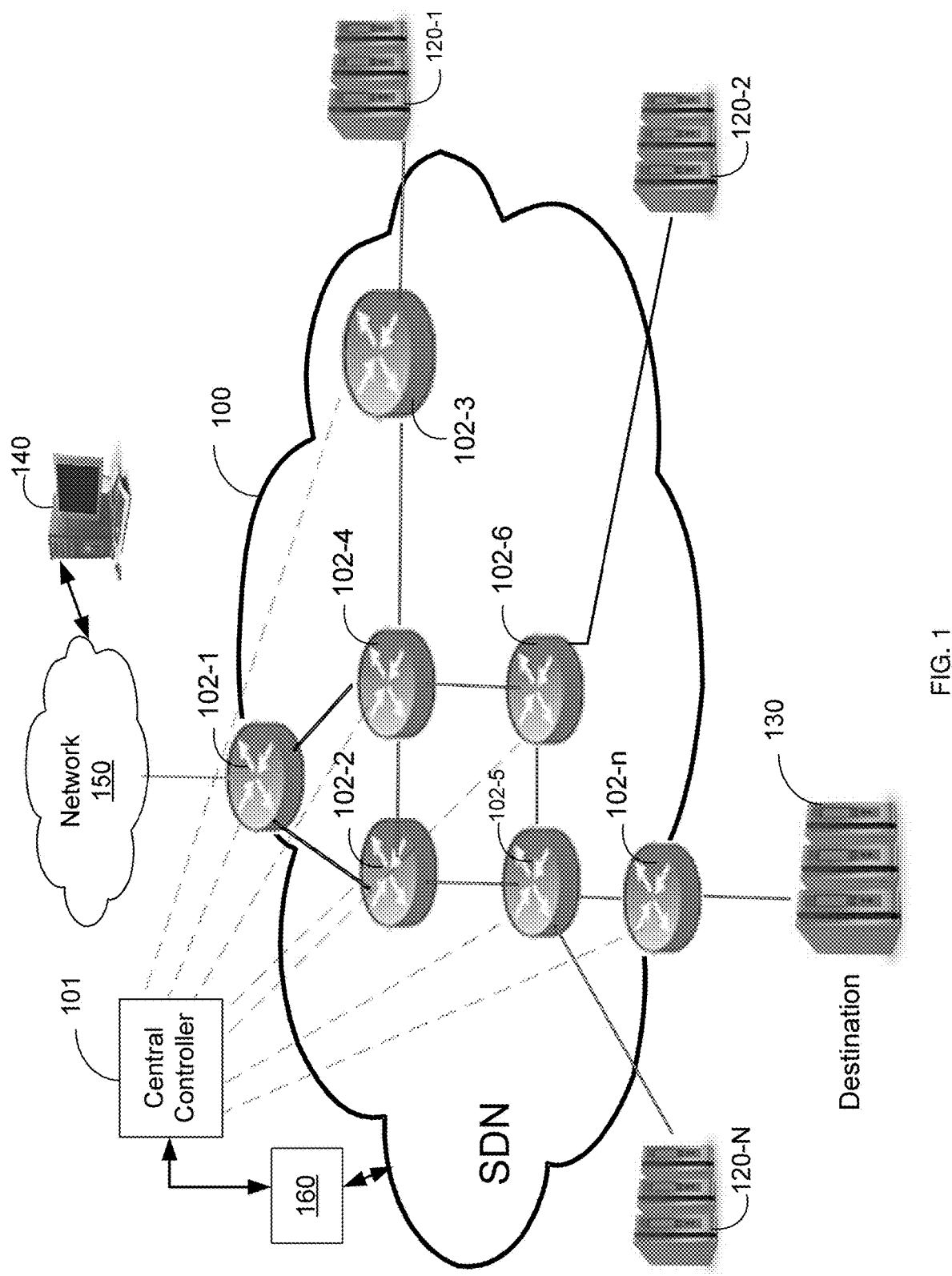
FIGS. 1 illustrates a network system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating a topology of a SDN-based network (hereinafter SDN) 100 utilized to describe the various embodiments discussed herein. The SDN 100 includes a central controller 101 and a plurality of network elements 102-1 through 102-N. To the SDN 100 are further connected at least one destination server 130 and at least one client device 140 that communicate with the destination server through an access network 150 and the SDN 100. The destination server 130 may be operable in a cloud-system infrastructure, a hosting server, service provider networks or a corporate network. In one exemplary configuration, each network element 102 is a switch that implements SDN-based provisions protocols such as, e.g., the OpenFlow protocol, and communicates with the central controller 101 via such protocol.

The access network 150 which is external to the SDN may be, for example, a WAN, the Internet, an Internet service provider (ISP) backbone, and the like. The SDN 100 can be implemented in wide area networks (WANs), local area networks (LANs), service provider backbones, datacenters, inter-datacenter networks, a private cloud, a public cloud, an hybrid cloud, and the like. It should be noted that although one client device 140 and one destination server 130 are depicted in FIG. 1 merely for the sake of simplicity, the embodiments disclosed herein can be applied to a plurality of clients, servers, and the like.

To the SDN 100 are further connected a plurality of value-add services (VAS) servers 120-1 through 120-N providing one or more value-added services or any other type of data services to traffic that originated from client device 140 and is addressed to the destination server 130. Such services include, but are not limited to, acceleration services, off-loading services, authentication, authorization, and accounting (AAA) services, security services, quality of service (QoS), quality of experience (QoE), parental control, access control (i.e., which subscriber can receive a particular service), traffic optimization, analytic services, content filtering, content caching, and so on. The security services include, for example, intrusion prevention, DoS/DDoS attacks mitigation, firewall, anti-virus, anti-spam, URL filtering, web application firewall (WAF), and so on. The acceleration services include, for example, WEB, caching, and protocol optimization, such as TCP optimization, HTTP optimization, HTML optimization, and so on. The off-loading services may include encryption and compression of data services, and the like.

It should be noted that the VAS servers 120 may not be endpoints of the networks. That is, flows of traffic processed by the VAS server 120 may be relayed back to the network 100 or may be terminated. The VAS servers 120 may include analytic servers, security systems, cache servers, and the like.

To provide service chaining in the SDN 100, that is, to divert incoming traffic addressed to the destination server through one or more VAS servers 120, the central controller 101 is configured to program the network elements 102 to perform this chaining task. As will be discussed in greater detail below, designating the packets to be diverted does not change their destination address. Once the processing is completed by the one or more VAS servers 120, the processed traffic is injected back into the network and is sent to the destination server 130.

Incoming traffic from the client device 140 can travel through one of the VAS servers 120-1, 120-N based on the services for which the owner of the destination server 130 paid. For example, the destination server 130 may be of a hosting company or a website that requires AAA and acceleration services. Thus, incoming traffic can be sent to the VAS server 120-1 for authenticating the client device 140 and then sent to perform HTTP optimization by a VAS server 120-2 that provides acceleration services.

According to the disclosed embodiments, the central controller 101 is configured to program the network elements 102 to route the traffic between the VAS servers 120, based on the service chaining determined for a flow. The programming of the network elements 102 is performed prior to receiving any packet related to the flow. To this aim, the center controller 101 is configured to perform a multi-layer steering process (or application) that predicates which VAS is assigned to a flow and steer incoming to the VAS either in the application-layer or network layer. In an embodiment, discussed in greater detail below, the multi-layer steering process requires minimal L7 (layer-7) processing, thereby reducing utilization of L7 resources and accelerating the diversion of the traffic through the SDN 100.

In one exemplary implementation, an application delivery controller (ADC) appliance 160 (or any other type of application-layer (L7) analysis device) is also connected to the SDN 100. An ADC, such as the ADC 160 typically distributes traffic between the servers to balance the load. Typically, the ADC 160 is configured with traffic distribution rules that are based on the availability of the servers (health), the load on the servers, and other parameters, such as the application persistency rules, global load balancing, and so on.

In an embodiment, the application-layer (hereinafter "L7) analysis performed by the ADC 160 includes at least inspection of hypertext transfer protocol (HTTP) parameters such as uniform resource locators (URLs), HTTP headers, host names, user names, cookies, and so on. The L7 analysis may also include inspection of the requested content. For example, such inspection may determine that a requested web page (identified by its URL) includes a relative number of scripts or multimedia content.

It should be appreciated that the HTTP is only one example of an application layer protocol, and that traffic of other protocols, including, but not limited to, SIP, FTP, and so on, can be processed as well. Thus, the disclosed embodiments are not limited to the analysis of HTTP parameters.

It should be further noted that the SDN 100 may include any number of network elements 102, each of which communicates with the central controller 101. It should be further noted that the SDN 100 may include a plurality of central controllers, each of which controls a group of network elements and can communicate with different ADCs locally or geographically connected to different sites. In addition, the plurality of central controllers may communicate with each other. The ADC 160 is also configured to communicate with the center controller 101.

According to the disclosed embodiments, the ADC 160 and the network elements 102 provide a multi-layer steering fabric of traffic to the different VAS services. The multi-layer steering fabric operates at L2-L4 to divert traffic to a VAS server 120 by the one or more network elements 102 and to perform L7 analysis on certain flows to determine their required service chaining. The multi-layer steering fabric is further configured to operate at L7 to divert traffic from and to the ADC 160. As will be discussed below, the ADC 160 can also be part of the multi-layer steering fabric.

In an embodiment, the central controller 101 is configured to analyze service chaining rules set by a user (e.g., a system administrator of a network carrier). A service chaining rule defines the VASs and their order that should be assigned to a specific flow of traffic. For example, a service chaining rule may be in the following format:

All traffic to <domain name> processed by $VAS_1$, then $VAS_2$, and then $VAS_3$ The $VAS_1$, $VAS_2$, and $VAS_3$ are value-added services, examples for which are provided above.

The central controller 101 is configured to analyze service chaining rules to determine whether L7 analysis is required or not for the respective flow. If a L7 analysis is required, incoming traffic is first diverted to the ADC 160 for L7 processing and then to the one or more VAS servers 120 that should perform the VAS defined in the service chaining rules. If a L7 analysis is not required, the network elements 102 are configured, by the controller 101, to divert the traffic directly to the one or more VAS servers 120 that should perform the VASs defined in a service chaining rule.

The network elements 102 divert the traffic based on a plurality of steering rules generated by the central controller 101. According to the disclosed embodiments, the network elements 102 are programmed with the steering rules prior to reception of packets belonging to a respective flow. For example, such programming may be performed when the system administrator configures the central controller 101 with the service chaining rules. The multi-layer steering process, as performed by the central controller 101, will be now discussed with reference to FIG. 2.

Figure 2:
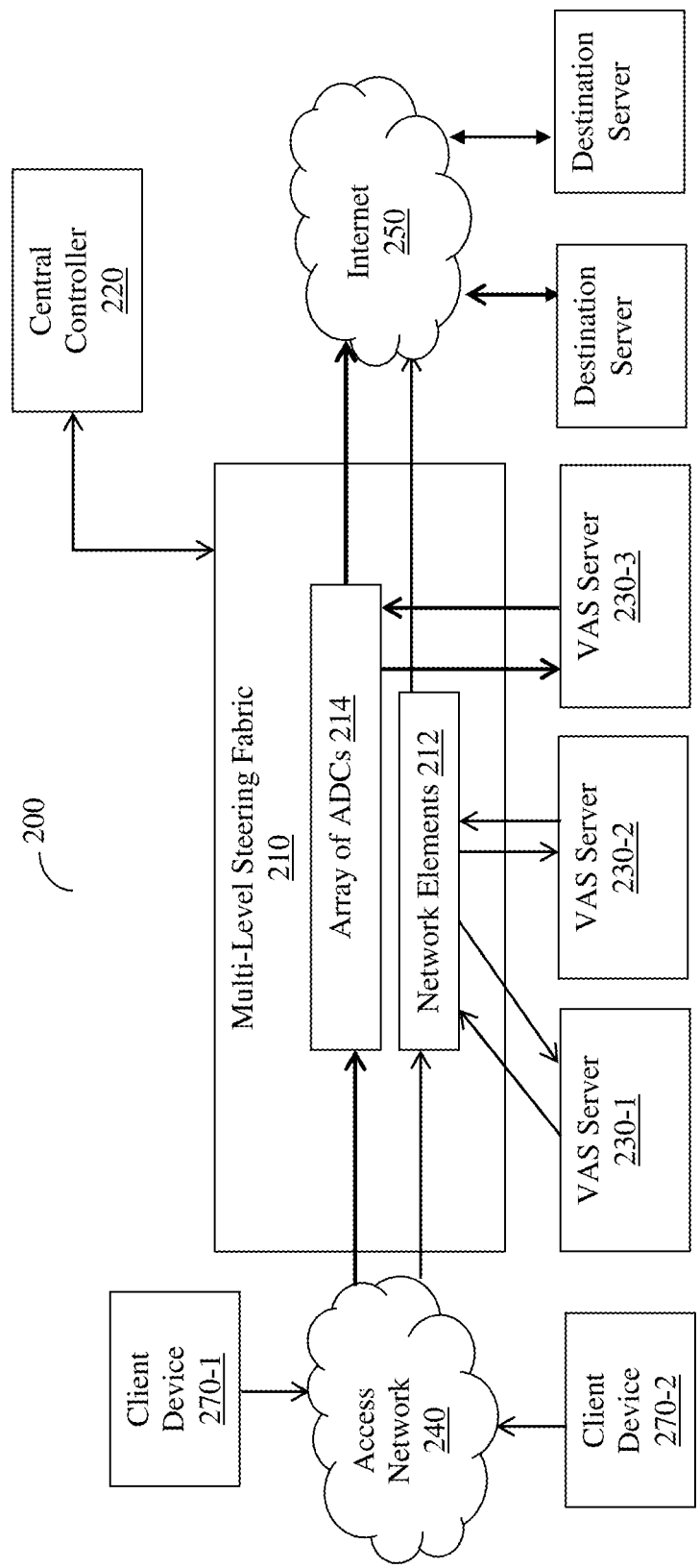
FIG. 2 illustrates exemplary steering rules utilized to program network elements of the SDN as performed by a central controller.

In the networked system 200 illustrated in FIG. 2, a multi-layer steering fabric 210 is communicatively connected to a central controller 220 and three VAS servers 230-1, 230-2, and 230-3, each of which is configured to provide a data service or a value-added service such those mentioned above. The fabric 210 is also communicatively connected to the access network 240 and the Internet 250. The access network 240 is discussed in greater detail above with respect to FIG. 1. To the access network 240 there are connected client devices 270-1 and 270-2. Traffic from either client device 270-1 or 270-2 flows through the access network 240 to the fabric 210 and the Internet 250. The fabric 210 and controller 220 are part of a SDN.

In an embodiment, the multi-layer steering fabric 210 includes a collection of SDN-network elements 212 and an elastic array of ADCs 214. The SDN-based network elements 212 can communicate with the central controller 220 through, for example, an OpenFlow protocol. Each ADC in the array of ADCs 214 is configured to perform L7 analysis on the received traffic during the learning mode. Such analysis includes, for example, inspection of the application layer (L7) parameters, such HTTP headers, URLs, host names, contents of the application, and so on. The L7 analysis is required to determine to which of the VAS servers 230 to divert the incoming traffic. An ADC in the array of ADCs 214 may be a virtual machine, a physical machine or combination thereof. In an embodiment, the array of ADCs 214 can configured to balance load traffic among VAS servers 230 that provide the same VAS. The load balancing can be performed based on global load balancing criteria. Such criteria may include, but are not limited to, proximity between a client and site, latency, cost, and so on.

It should be noted that the network elements 212 and the array of ADCs 214 handle traffic at a different layer (of the OSI model). In an embodiment, L2-L4 steering of traffic is performed by the network elements 212, while a L7 traffic steering is through the elastic array of ADCs 214.

As noted above, the central controller 220 determines the steering rules based on the analysis of the service chaining rules. Specifically, the central controller 220 determines which flows require L7 analysis respective of the service chaining rules analysis. In an embodiment, the central controller 220 analyzes each service chaining rule to determine if the rule includes L3/L4 (network/transport layer) parameters and/or L7 parameters having their respective L3/L4 values known a-priori.

A L3/L4 parameter may include, for example, a source IP address, a destination IP address, an IP port, a TCP port, and so on. A L7 parameter having a value known a-priori may include, for example, a URL (hostname) and a user agent. The user agent is a type of the web browser of the client device, e.g., a Firefox®, Internet Explore®, and the like. The source user agent can be identified without any L7 analysis. Other L7parameters whose values can be determined through L7 analysis may include a URL path, a cookie, a filename, a file type, an XML tag, a domain name server (DNS) query various parameters in the header, and so on.

As an example, a service chaining rule may be defined as follows:

Direct all traffic to CNN, from client_1 or client_2, through $VAS_1$ and $VAS_2$ In this example, the "CNN" is a L7 parameter (host name) having a L3/L4 value that can be determined a-priori. That is, a destination IP address of "cnn.com" can be identified using an IP lookup or a simple DNS query. The client_1 and client_2 are client devices 270-1 and 270-2, each of which having known or identifiable source IP address.

Therefore, for the above service chaining rule no L7 service analysis is required. An network-layer steering rules generated for the above service chaining rule will steer all traffic from either of the client devices 270-1 and 270-2 originated to the cnn.com through the VAS server 230-1 and then VAS server 230-2.

Non-limiting examples for a network-layer steering rule may include, but are not limited to:

IF: IP.Sourc_IP=IP_001 or IP_002 AND
    IP.DEST=IP_003                              1.

Action: steer traffic to a network element connected to VAS server 1 and then to a network element connected to VAS server 2.

In the steering rule (1), the destination IP_003 is mapped to a hostname of "cnn.com". The source IP addresses IP_001 and IP_002 are of the client devices 270-1 and 270-2 respectively. The VAS server 1 and VAS server 2 are VAS servers 230-1 and 230-2 respectively.

As another example, for the operation of the central controller 220, the following service chaining rule is set:

Direct all image traffic to Google from user1 needs through VAS3

In this rule, the L7 parameter in this rule may be related to the phrase "all image traffic" and can be mapped to file names. As the file name may be changed from session to session, their values are not known a-priori. Thus, in this case, the L7 analysis is required. The L3/L4 values of Google and user1 can be determined a-priori as discussed above.

Therefore, an application-layer steering rule defined for the this type of service chaining rule would require diverting traffic from user1 "google.com" through the array of ADCs 214 for L7 analysis. When the L7 analysis is completed by an ADC in the array of ADCs 214, the traffic matching the rule can be steered to the VAS server 220-3 providing $VAS_3$.

Non-limiting examples for an application-layer steering rule may include, but are not limited to:

IF: IP.Sourc_IP=IP_001 AND IP.DEST=IP_004        2.

Action: steer traffic to an $ADC_1$
And

IF: filename=*.jpg" AND IP.DEST=IP_004        3.

Action: steer traffic to an $ADC_3$

In the steering rules (2) and (3), the destination IP_004 is mapped to a hostname of "google.com". The source IP address IP_001 is of the client device 270-1. The $ADC_1$ is one of the ADCs in the array 214, and $VAS_3$ is the VAS server 230-3.

In an embodiment, the steering rule (2) is performed by a network element 212 connected at the access network 240, while the steering rule (3) is performed by an ADC in the array of ADCs 214. The central controller 220 is configured to generate the steering rules and program the network elements 212 and the ADC 214 of the fabric 210 respective to their determined rule. Therefore, the fabric 210 together with the multi-layer steering process performed by the central controller 220 provide a multi-layer traffic steering.

Although not shown in FIG. 1, the path between network elements 212, the array of ADCs 214, and/or the VAS servers 230 may also include "standard" network appliances such as switches, routers, firewall devices, and the like.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, at least one of the network elements in the path to the servers 230 should be adapted to allow programmability by the central controller 220 adapted to operate in a SDN-based network. It should be further noted that in certain embodiments, the L7 analysis or certain functions of such analysis can be performed by the central controller 220.

In an embodiment, a predicative learning process based on the L7 analysis and certain traffic flows is performed. The learning process attempts to map L7 parameters having unknown values (at the outset) to L3/L4 parameters respective of the L7 analysis. In this embodiment, an incoming traffic flow is directed to the array of ADCs 214 for an L7 analysis. The central controller 220 is configured to receive the L7 analysis results that may include an association between at least one L3/L4 parameter value and at least one L7 parameter. Preferably, such association would include at least a VAS associated with the at least one application-layer parameter.

The central controller 220 is further configured to determine if the L7 analysis results are sufficient to steering of the subsequent incoming traffic flows; and if so, the central controller 220 configures the fabric 210 to stop forwarding incoming traffic flows to the array of ADCs 214 and steer the incoming traffic flow to the respective VAS server 230 directly through the network elements 212.

When performing a predicating learning process, the central controller 220 is further configured to generate a classification table. The classification table includes a mapping of the at least one L3/L4 parameter to the at least one L7 parameter, and potentially a VAS or any other L7 service.

An exemplary classification table 300 is illustrated in FIG. 3. The table 300 includes a plurality of L3/L4 parameters 310, a plurality of L7 parameters 320, and one or more VAS services 330 associated with the plurality of L7 parameters 320. During the predicative learning mode of operation, the L3/L4 parameters are associated with L7 parameters and their respective VAS services.

In an embodiment, the central controller concludes the learning phase when the classification table 300 includes sufficient information to generate steering rules that would allow diversion of the traffic flow directly to the VAS serves by the network elements 212, that is, without any L7 processing. It should be noted that the classification table 300 can be frequently updated even during the steering mode of operation.

As noted above, the L7 analysis of the traffic flows consumes high networking and computing resources. According to one embodiment, in order to significantly reduce the utilization of such resources, once the classification table is ready, the central controller stops the L7 analysis. That is, classified traffic is directed away from the ADC 214 because, when the classification table is ready, the L7 parameters are considered to be known, and as such the center controller can generate and program a set of steering rules instructing the network elements 212 in the fabric 210 to direct traffic directly to the VAS servers 230. It should be noted that the predicative learning process and steering processes discussed respective thereof may be related to specific flows, and do not necessarily relate to the entire operation of the SDN and/or the L7 analysis.

The process of the predictive learning and the generation of the classification table is discussed in more detail in the Co-Pending U.S. patent application Ser. No. 14/339,903 to Navon, et al. assigned to the common assignee of the present application and incorporated herein by reference.

In an exemplary and non-limiting embodiment, the steering rules generated by the central controller 210 can be constructed to encapsulate in a diversion field a destination VAS server in a packet belonging to a flow assigned with a service chaining. The diversion field may be a pre-defined field in the IP (Layer-3) header or an Ethernet/MAC (Layer-2) header. For example, various fields in an IPv4 packet header, such as a TTL field, a DSCP field, or any combination thereof can be utilized.

As another example, a source MAC address field or a VLAN tag in an Ethernet (Layer-2) header can be utilized as the diversion field. Because the source MAC address is a unique number, it cannot be used by any other Ethernet network interfaces of the devices in the SDN, thereby setting the source MAC address field of the incoming packet, from an edge or peer network elements, to a unique predefined value that can be used as an indication as to the traffic diversion requirement. To this end, a set of such unique MAC addresses is defined to support diversion to multiple servers or systems that provide L7 services. In the layer-2 SDN-based networks, the MAC learning is typically performed by the central controller and not by each network element. As a result, the MAC learning operation in the network is not disturbed when the source MAC address is changed and used as a diversion value. In layer-3 SDN-based networks, no MAC learning is performed based on a source MAC address. However, each router is configured by the central controller to not update the source MAC address field when such field contains a pre-defined unique value. It should be noted that the different options can be utilized to divert the traffic to different VAS destinations. It should be noted that the different options can be utilized to divert the traffic to different VAS destinations.

Some embodiments for generating the VAS service for creating steering rules based on a diversion field to allow service chaining in the SDN are discussed in discussed in more detail in the co-pending U.S. patent application Ser. No. 13/913,932 to Doron, et al. assigned to the common assignee of the present application and incorporated herein by reference.

Figure 4:
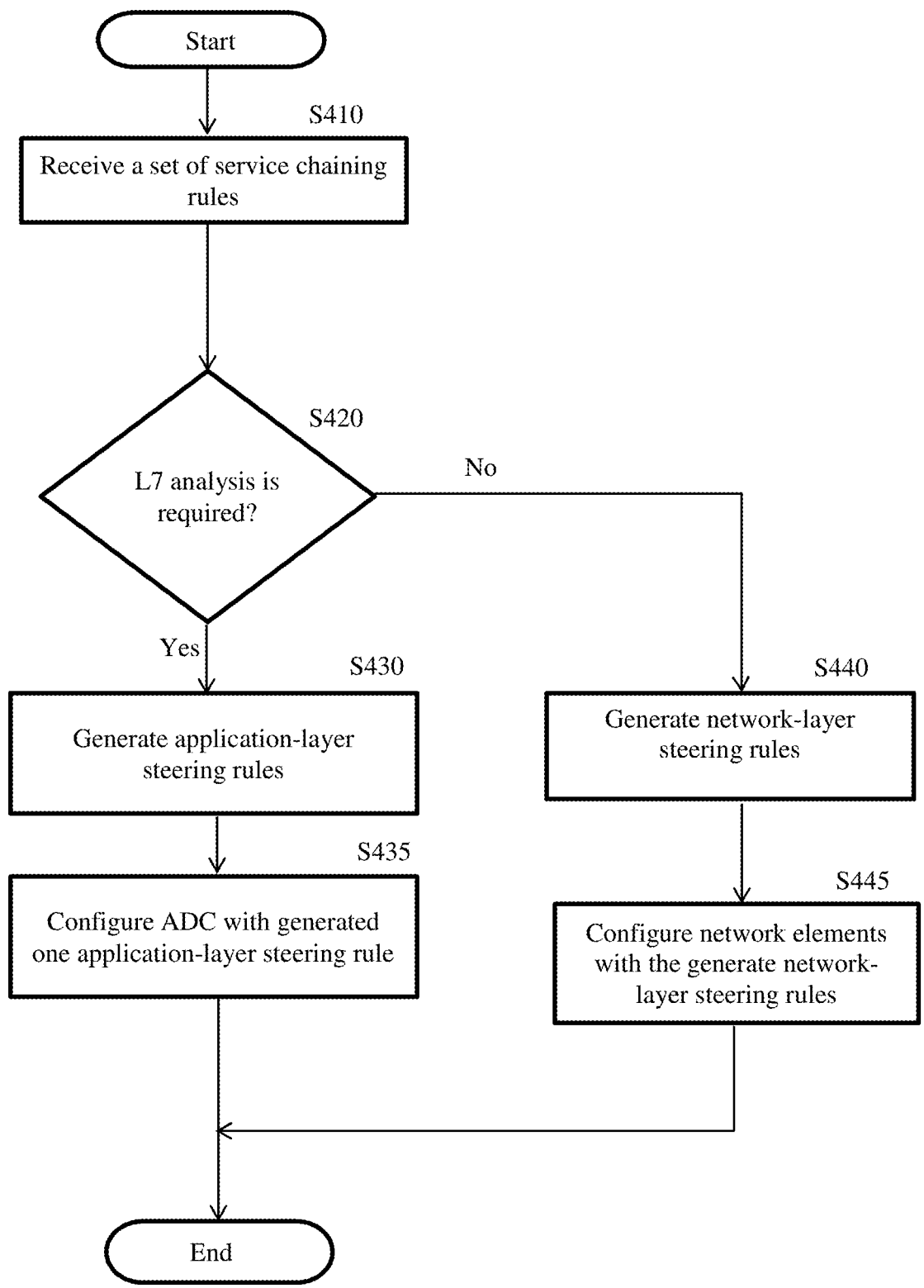
FIG. 4 is a flowchart describing a method for a multi-layer steering process according to one embodiment.

FIG. 4 shows an exemplary and non-limiting flowchart 400 illustrating a method for performing multi-layer steering of traffic according to one embodiment. In an embodiment, the method is performed by a central controller deployed and operable in a SDN. In another embodiment, one or more value-added services should be assigned to the traffic.

At S410, a set of service chaining rules is received. A service chaining rule defines the VASs and their order that should be assigned to a specific flow. Examples for service chaining rules are provided above. At S420, each of the received service chaining rules is analyzed in order to determine if a L7 analysis rule is required. Specifically, a service chaining rule is analyzed to determine if the rule includes L3/L4 parameters and/or L7 parameters having their respective L3/L4 values known a-priori.

As noted above, the L3/L4 parameter may include, for example, a source IP address, a destination IP address, an IP port, a TCP port, and so on. A L7 parameter having a value known a-priori may include, for example, a URL (hostname). The output of S420 would classify the received service chaining rules into two groups. A first group of rules requires L7 analysis while a second group of rules does not require L7 analysis. In an embodiment, the processing of the first and second groups continues with S430 and S440 respectively.

At S430, at least one application-layer steering rule is generated respective of each service chaining rule that requires L7 analysis. The application-layer steering rule would define steering traffic of flows comply with a rule requiring L7 processing to an ADC (or any other L7 device) that performs L7 analysis. In an embodiment, the at least one application-layer steering rule would further define steering traffic having been processed by the ADC to one or more VAS services that perform the VAS defined in the respective service chaining rule. At S435, the ADC is configured to the at least one generated one application-layer steering rule.

At S440, at least one network-layer steering rule is generated respective of each service chaining rule that does not require L7 analysis. The network-layer steering rule would define steering traffic of flows, by network elements (e.g., elements 212), to the VAS services that perform the VAS defined in the respective service chaining rule. At S445, the network elements are configured with the at least one generated one network-layer steering rule. It should be noted that the network-layer steering rule can be utilized to instruct, program, or configure any network element operating also in layer-2 (MAC) and layer-4 (transport) layers.

Upon, the completion of S435 and S445, a multi-layer steering fabric (e.g., fabric 210) is configured to operate at L2-L4 to divert traffic to a VAS server 120 by the one or more network elements and to operate at L7 to divert traffic from and to an ADC. Thereafter, incoming flows received at the fabric are processed according to the application-layer and network-layer steering rules.

It should be appreciated that the added flexibility to provision application-level steering rules along with existing L3-L4, through SDN architecture (an application aware network), enable faster delivery of new VAS services in a cost effective manner. This approach further reduces the need for networking-computing intensive L7 analysis of high volume traffic in the data path.

In an exemplary embodiment, when the L7 analysis provides sufficient information to allow predication of a VAS service that incoming traffic flow should be directed, the at least one application-layer steering rule may be replaced by a new network-layer steering rule generated by the central controller. The new network-layer steering rule may be generated using information included in the classification table as discussed in detail above.

Figure 5:
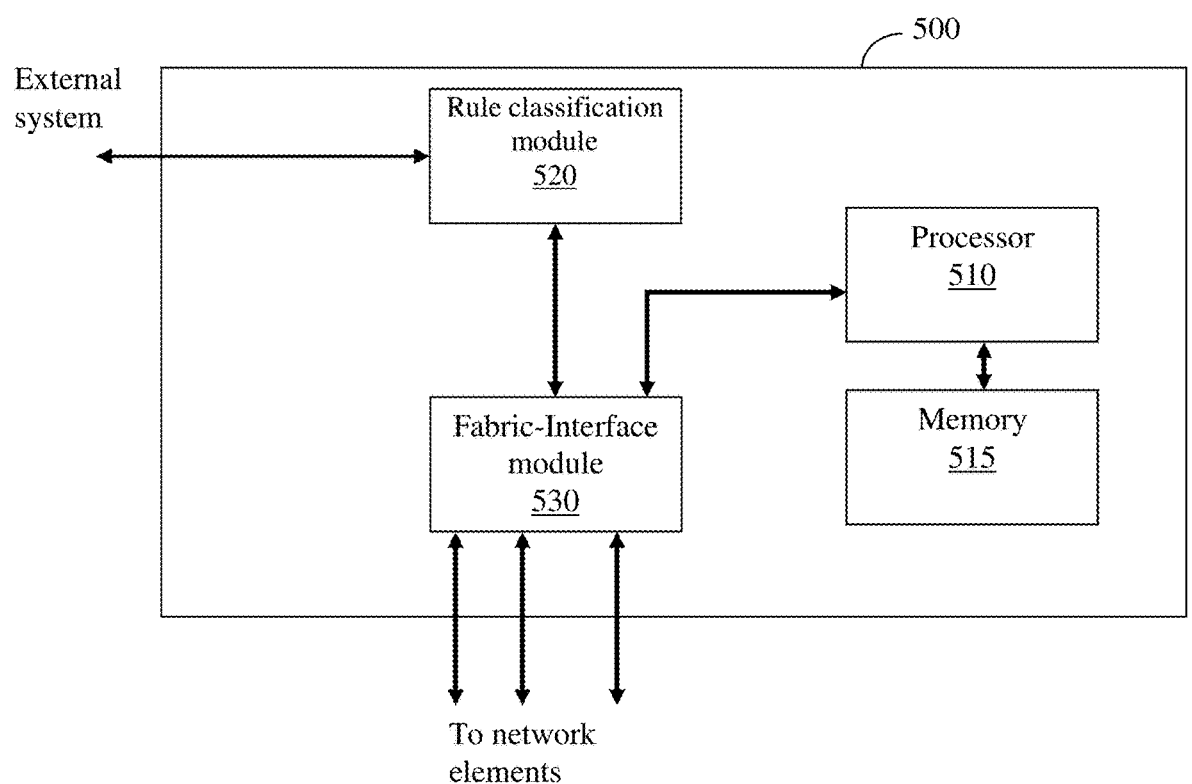
FIG. 5 shows an exemplary and non-limiting block diagram of the central controller constructed according to one embodiment.

FIG. 5 shows an exemplary and non-limiting block diagram of a central controller 500 constructed according to one embodiment. The central controller 500 is operable in SDNs and is often at least configured to execute the multi-layer steering process described in greater detail above with respect to FIGS. 2 and 4. The controller 500 includes a processor 510 communicatively connected to a memory 515, a rule classification module 520, and a fabric-interface module 530. In various embodiments, the memory 515 may contain instructions that, when executed by the processor 510, configure the central controller 500 to perform the multi-layer steering process described in more detail herein above.

The fabric-interface module 530 allows the communication with the network elements of the SDN and ADCs in a multi-layer steering fabric (e.g., fabric 210). In one embodiment, such communication uses the Open Flow protocol through which a secure channel may be established with each network element and ADCs.

The rule classification module 520 is configured to analyze service chaining rules (provided by, e.g., a system administrator of the network carrier) to determine if such rules would require L7 analysis in order to steer traffic to a respective VAS server or servers defined in the service chaining rules. In addition, based on the analysis the rule classification module 520 generates at least one application-layer steering rule and/or at least one network-layer steering rule as discussed in further detail herein above. The rule classification module 520 is configured to program with the network elements and/or ADCs with the generated steering rules through the fabric-interface module 530. In an embodiment, the rule classification module 520 can execute an application layer analysis process to inspect traffic at this layer.

The processor 510 uses instructions stored in the memory 515 to execute tasks traditionally performed by the central controllers of SDN and optionally for execution of the tasks performed by the modules 520 and 530. The central controller 500 in another embodiment includes a combination of application specific integrated circuits and processors. In a further embodiment, the controller 500 is distributed across several devices and processors.

In another embodiment, the modules 520 and 530 of the controller 500 can be realized by one or more processing systems. A processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The foregoing detailed description has set forth a few of the many forms that different embodiments can take. It is intended that the foregoing detailed description be understood as an illustration of selected forms of the various embodiments and not as limiting the scope of the disclosed embodiments.

Most preferably, the various embodiments discussed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for multi-layer traffic steering for enabling service chaining over a software defined network (SDN), the method is performed by a central controller of the SDN, comprising:
    receiving, at the central controller of the SDN, at least one service chaining rule defining at least one value-added service (VAS) to assign to an incoming traffic flow addressed to a destination server:
    analyzing, by the central controller of the SDN, each of the at least one received service chaining rule to determine if an application-layer steering is required;
    wherein analyzing each of the at least one received service chaining rule further comprises:
    determining that the at least one received service chaining rule requires an application-layer analysis when the at least one service chaining rule contains at least one application-layer parameter that has a value that is not known a-priori;
    generating, by the central controller of the SDN, at least one application-layer steering rule, upon determining that an application-layer steering is required;
    generating, by the central controller of the SDN, at least one network-layer steering rule, upon determining that an application-layer steering is not required; and
    programming, by the central controller of the SDN, a multi-layer steering fabric with the generated at least one of network-layer steering rule and application-layer steering rule;

wherein routing decisions for traffic in the network are made by the central controller so that the central controller implements the control path of the SDN.

2. The method of claim 1, wherein the multi-layer steering fabric includes an array of application delivery controllers (ADCs) configured to perform application-layer (L7) analysis and a plurality of SDN-based network elements.

3. The method of claim 2, wherein generating the at least one application-layer steering rule further comprises:
receiving, from the array of ADCs, application-layer analysis results;
determining at least one VAS server to direct incoming traffic based on the application-layer analysis results; and
generating the at least one application-layer steering rule by defining a steering action to steer an incoming packet based on at least one application-layer parameter designated in the packet.

4. The method of claim 3, wherein programming the multi-layer steering fabric further comprises:
programming the array of ADCs with the least one application-layer steering rule, thereby steering of incoming traffic to the VAS server is performed at an application-layer.

5. The method of claim 2, wherein generating the at least one network-layer steering rule further comprises:
determining at least one VAS server to direct incoming traffic based on the analysis of the service chaining rule; and
generating the at least one network-layer steering rule by defining a steering action to steer an incoming packet based on at least one network-layer parameter designated in the packet.

6. The method of claim 5, wherein programming the multi-layer steering fabric further comprises:
programming the plurality of the SDN-based network elements with the least one network-layer steering rule, thereby steering of incoming traffic to the VAS server is performed at an Ethernet layer through a network-layer.

7. The method of claim 5, wherein the at least one network parameter is any one of: a source IP, a destination IP address, a port number, and a layer-4 protocol type.

8. The method of claim 1, wherein the receiving is performed prior to receipt of any traffic by the SDN for the traffic flow.

9. The method of claim 1, wherein the VAS is any one of: a virus scan, a spam filtering, a cyber-attack mitigation, quality of service (QoS), quality of experience (QoE), a parental control, an access control, traffic optimization, an analytic service, content filtering, and content caching.

10. A non-transitory computer readable medium having stored thereon instructions for causing one or more processing units to execute the method according to claim 1.

11. A system for multi-layer traffic steering for enabling service chaining over a software defined network (SDN), comprising;
a processing unit; and
a memory, the memory containing instructions that, when executed by the processing unit, configure the system to:
receive, at a central controller of the SDN, at least one service chaining rule defining at least one value-added service (VAS) to assign to an incoming traffic flow addressed to a destination server;
determine that the at least one received service chaining rule requires an application-layer analysis when the at least one service chaining rule contains at least one application-layer parameter that has a value that is not known a-priori;
analyze, by the central controller of the SDN, each of the at least one received service chaining rule to determine if an application-layer steering is required;
generate, by the central controller of the SDN, at least one application-layer steering rule, upon determining that an application-layer steering is required;
generate, by the central controller of the SDN, at least one network-layer steering rule, upon determining that an application-layer steering is not required; and
program, by the central controller of the SDN, a multi-layer steering fabric with the generated at least one of network-layer steering rule and application-layer steering rule;
wherein routing decisions for traffic in the network are made by the central controller so that the central controller implements the control path of the SDN.

12. The system of claim 11, wherein the multi-layer steering fabric includes an array of application delivery controllers (ADCs) configured to perform application-layer (L7) analysis and a plurality of SDN-based network elements.

13. The system of claim 11, wherein the system is further configured to:
receive, from the array of ADCs, application-layer analysis results;
determine at least one VAS server to direct incoming traffic based on the application-layer analysis results; and
generate the at least one application-layer steering rule by defining a steering action to steer an incoming packet based on at least one application-layer parameter designated in the packet.

14. The system of claim 12, wherein the system is further configured to: program the array of ADCs with the least one application-layer steering rule, thereby steering of incoming traffic to the VAS server is performed at an application-layer.

15. The system of claim 12, wherein the system is further configured to: determine at least one VAS server to direct incoming traffic based on the analysis of the service chaining rule; and
generate the at least one network-layer steering rule by defining a steering action to steer an incoming packet based on at least one network-layer parameter designated in the incoming packet.

16. The system of claim 15, wherein the system is further configured to: program the plurality of the SDN-based network elements with the least one network-layer steering rule, thereby steering of incoming traffic to the VAS server is performed at an Ethernet layer through a network-layer.

17. The system of claim 15, wherein the at least one network parameter is any one of: a source IP, a destination IP address, a port number, and a layer-4 protocol type.

18. The system of claim 11, wherein the at least one service chaining rule is received prior to receipt of any traffic by the SDN for the traffic flow.

19. The system of claim 11, wherein the VAS is any one of: a virus scan, a spam filtering, a cyber-attack mitigation, quality of service (QoS), quality of experience (QoE), a parental control, an access control, traffic optimization, an analytic service, content filtering, and content caching.

20. A multi-layer steering fabric connected in a software defined network (SDN), comprising:
circuitry forming an array of individual application delivery controllers (ADCs) that determine that at least one received service chaining rule requires an application-layer analysis when the at least one service chaining rule contains at least one application-layer parameter that has a value that is not known a-priori;

perform application-layer (L7) analysis, wherein each of the ADCs of the array is programmable to perform application-layer steering rules; and a plurality of SDN-based network elements, wherein each of the plurality of SDN-based network elements is programmable to perform network-layer steering rules.

21. The multi-layer steering fabric of claim 20, wherein a network-layer steering rule defines a steering action to steer an incoming packet based on at least one network-layer parameter designated in the incoming packet, and wherein an application-layer steering rule defines a steering action to steer an incoming packet based on at least one application-layer parameter designated in the packet.

22. The multi-layer steering fabric of claim 20, wherein the array of ADCs and the plurality of SDN-based network elements are programmable by the central controller.

\* \* \* \* \*